Patented July 17, 1934

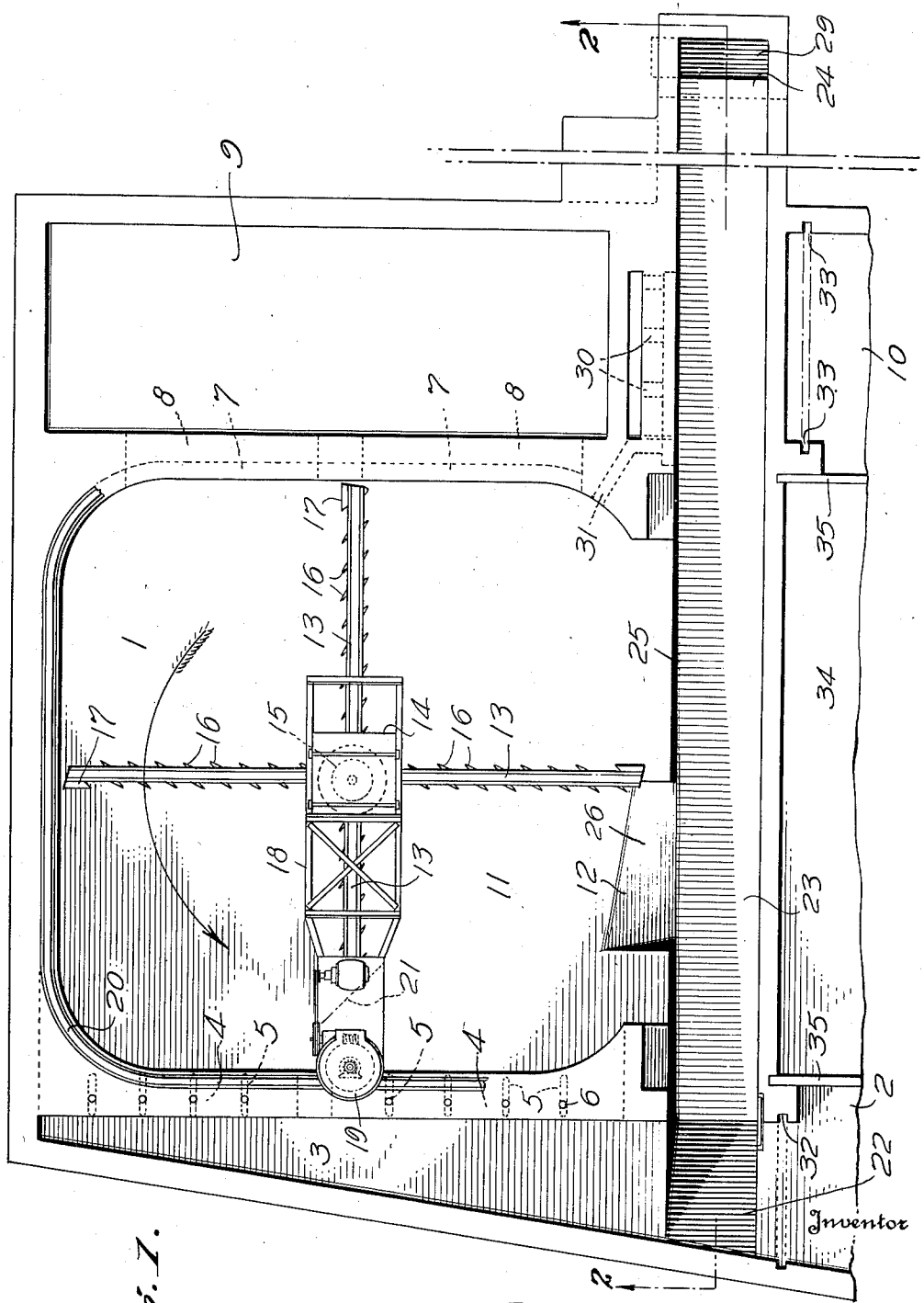

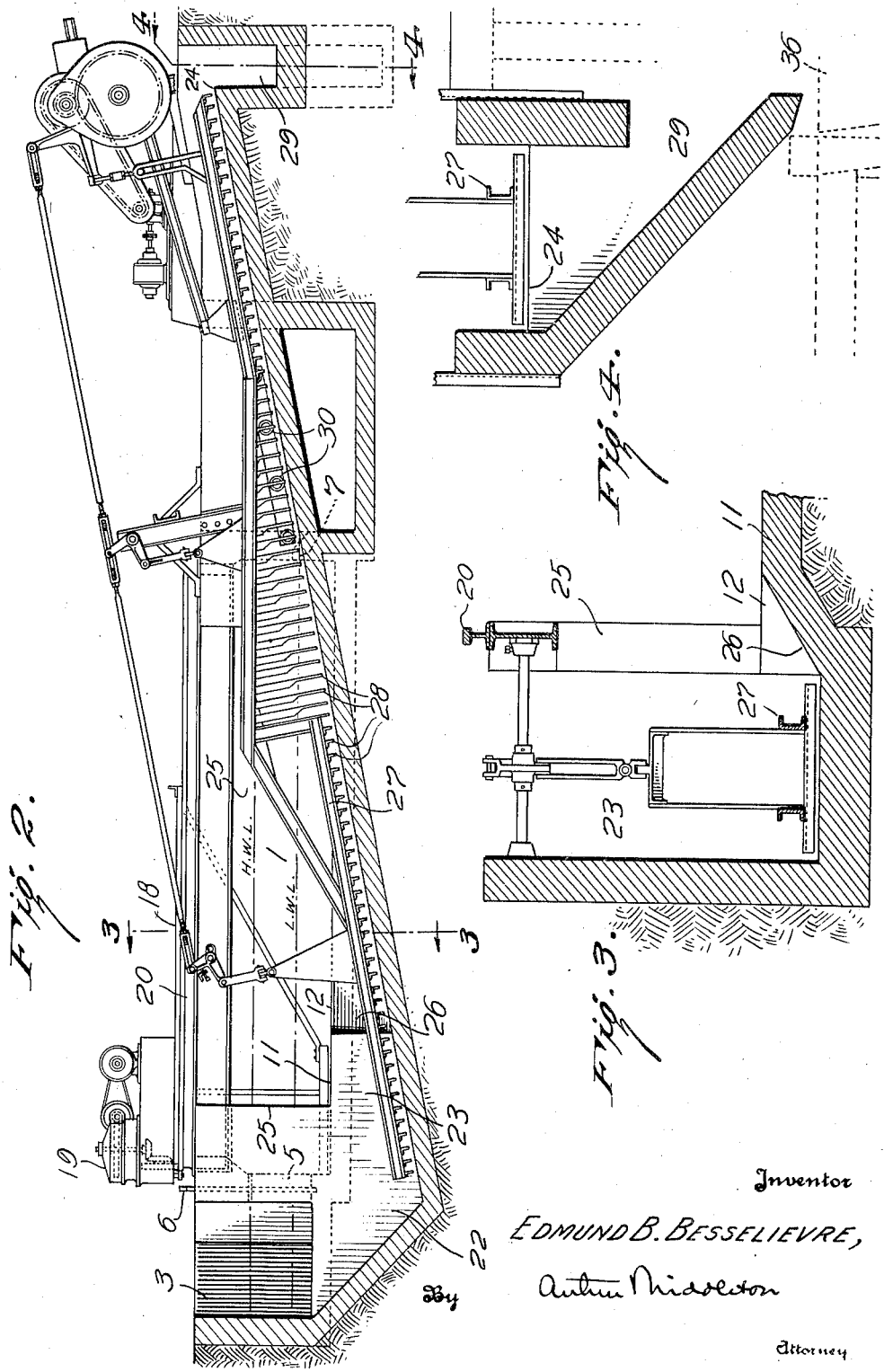

1,967,196

UNITED STATES PATENT OFFICE 1,967,196

GRIT REMOVAL APPARATUS

Edmund B. Besselievre, Spring Lake, N. J., assignor, by mesne assignments, to The Dorr Company, Inc., New York, N. Y., a corporation of Delaware Application May 19, 1931, Serial No. 538,443

4 Claims. (Cl. 210—55)

The present invention relates to improvements in apparatus for the continuous removal of grit or other heavy detritus from detritus bearing liquids such as sewage, and particularly to such apparatus for use in combined sanitary and storm-water sewage systems.

In a combined sanitary and storm-water sewage system, the amount of grit passing into the system during storm flow is far in excess of that accompanying normal flow, so that any apparatus designed and proportioned for the continuous removal of grit from the normal flow economically would be greatly overloaded if called upon to handle the excess amount of grit accompanying storm flow. Any attempt to solve the problem by the obvious expedient of providing larger or additional apparatus would make for excessive first cost, with plant inefficiency at normal flow, and the unnecessary handling, by settling apparatus, of bodies of settled grit accompanying storm flow, while the extra amount of heavy grit particles brought down in storm flow would tend to settle mostly in one part of the apparatus, producing unequal strain therein.

An important object of the present invention is therefore to provide means for removing the excess detritus accompanying storm flow, without the necessity of increasing the size of the plant commensurate with the increased proportion and amount of detritus carried into the system during storm flow.

Most of the detritus brought down in storm flow passes along the bottoms of the conduits and channels toward the settling apparatus in the form of bodies or accumulations of settled detritus and therefore requires substantially no additional sedimentation treatment for its segregation. Advantage is taken of this fact in the attainment of the chief object of the invention, by the provision of an arrangement whereby substantially all of the detritus in this form is trapped out of the sewage on the way to the main settling chamber, leaving substantially only the usual finer or lighter grit to be carried on to the settling chamber of the main settling and segregating system. With this is combined an arrangement whereby the grit segregated by the trap, together with that segregated by the normal or main grit segregating system, is operated upon by a unitary classifying apparatus operable to remove the accumulated grit from the system in a dewatered state substantially free from organic matter.

The invention is illustrated in the accompanying drawings in which:

Fig. 1 is a plan view with the classifying mechanism omitted.

Fig. 2 is a vertical section on the line 2—2 of Fig. 1.

Fig. 3 is a section on line 3—3 of Fig. 2.

Fig. 4 is a section on the line 4—4 of Fig. 2.

Referring to the drawings in detail, a main settling chamber 1 is arranged to receive the sewage from the main collection channel 2 by way of an influent channel 3 and inlet opening 4 provided with pivoted distributing vanes 5 adjustable by means of their spindles 6 to effect an even flow into the settling chamber. Outlet for the chamber is provided by way of weirs 7 in openings 8 into an effluent channel 9 leading to the outlet sewer trunk or channel 10. The bottom 11 of the chamber 1 is substantially level and is sunken a slight distance below the common level of the influent channel 3 and inlet opening 4. For removing the settled grit and other settled solids from the chamber 1, the chamber is provided with raking mechanism which may be of any known or other suitable form operable to impel the settled solids toward and into the discharge outlet 12. The form of raking mechanism shown is of a known type comprising rake arms 13 carried by a rotary support 14 pivotally mounted on a central pillar 15 at a point above the high water level. These rake arms 13 carry a series of scraping blades or rakes 16 set at an angle as shown so as to impel the settled solids along the bottom of the chamber toward the periphery upon rotation in the direction indicated by the arrow in Fig. 1. A scoop 17 carried at the outer end of each rake arm 13 operates to sweep the solids raked into their zone of travel into the discharge outlet 12. To prevent the wedging of grit between the outer side of the scoop 17 and the wall of the chamber, the outer side of the scoop is inclined slightly inwardly from its leading edge. Rotation of the support 14 is effected by means of a driving arm 18 slidably connected therewith and extending to the periphery of the chamber where it is supported by a power driven tractor arrangement 19 on a traction and guide rail 20 extending around the periphery. The particular form of the tractor arrangement 19 is not an essential feature of the present invention and may be any known or other suitable form operable to carry the outer end of the driving arm 18 around the periphery along the rail 20. For collecting solids settling in and near the corners of the chamber beyond the zone of travel of the scoops 17, a scoop or sweep 21 is mounted on the slidable driving arm 18 to be carried thereby around on the bottom of the chamber close to the wall, following the wall into and out of the corners as the driving arm guided by the rail 20 is moved radially outwardly and inwardly in approaching and leaving the corners.

To effect preliminary segregation of the heavier detritus, especially that brought down in extra quantity during storm flow, a settling pit or trap 22 is formed in the main collection channel 2 ahead of the influent channel 3 so that the flow of sewage will pass over this trap on its way to the settling chamber 1. This settling pit is provided by a depressed pocket or pocket portion that extends the full distance across and a substantial distance below the floor portion of the channel in which it is located and that portion of the main channel within which the pit is located may be considered as part of the influent channel leading to the settling chamber 1. The pocket in fact intercepts the bottom or floor of the channel and it provides a sand or grit trap of substantial size. As shown in Fig. 2, this preliminary settling pit or trap extends well below the level of the discharge outlet 12 in the bottom of the main chamber 1 and forms the lower end of a solids conveying channel or classifier trough 23 which slopes upwardly along one side of the main settling chamber 1 to a solids discharge end 24 above the high water level H. W. L. (Fig. 2). The chamber communicates with the classifier trough 23 through a large opening 25 in the side adjacent thereto, the bottom 26 of the discharge outlet 12 sloping downwardly to the bottom of the trough. All settled solids discharged from the chamber 1 through outlet 12 are therefore discharged onto the bottom of the trough 23, to wit, to and upon an intermediate section of the trough. In other words the settled solids or sludge from the outlet 12 are delivered to and upon a submerged section of the sloping bottom of the trough that is at a higher elevation than the bottom portion of the pocket but at lower elevation than the solids discharge section of the trough. The sludge discharge outlet 12 is separated or spaced from the influent channel—either channel 2 or 3—whereby there is avoided any tendency for the sludge to become mixed with the incoming sewage before the sludge has been subjected to classification. A mechanical classifier mechanism 27 is mounted in the classifier trough 23 as indicated in Fig. 2, and arranged to convey the settled solids deposited in the trough to the discharge end 24. This mechanism may be of any known or other suitable type, preferably of the reciprocating rake type as shown, operable to produce sufficient agitation to throw the lighter solids into suspension for a purpose which will presently appear. As the mechanism 27 here shown is the well known Dorr classifier mechanism disclosed in United States Patent No. 1,156,543 issued October 16, 1915, the operation of which is well understood by those skilled in the art, it suffices to point out that it operates to reciprocate the rakes 28 along the trough, moving them along the bottom of the trough during the upward stroke at the end of which stroke they are raised from the bottom of the trough, and maintained in the raised position during the return stroke and lowered at the end of the return stroke to again move along the bottom in the succeeding upward stroke. It thus operates to rake the settled grit up the trough 23 to the discharge end 24. A grit chute 29 is arranged below the discharge end to receive the grit and convey it to a receiver 36 of any suitable form such as a bucket or car. In the side of the trough 23, below the discharge end are several liquid return openings 30 arranged in a row substantially parallel to and spaced slightly above the bottom of the trough, and extending from a level slightly above the low water level L. W. L. (Fig. 2) to a level slightly above the high water level H. W. L. These openings communicate with the liquid return channel 31 leading back into the main settling chamber 1.

To enable the entire settling and classifying apparatus to be disconnected from the sewage system when so desired, the main collection channel 2 and outlet channel 10 are provided with stop-board grooves 32 and 33, respectively, to receive suitable stop-boards for closing off connection with the apparatus, and are connected by a by-pass channel 34 normally closed off by suitable stop-boards 35.

In operation, assuming a storm flow, the combined sewage passes through collecting channel 2 over the pit or trap 22 into the influent channel 3 from whence it passes by way of inlet openings 4 into the main settling chamber 1 and out over the weirs 7 to the effluent channel 9 and thence on through the outlet channel 10. The grit and other relatively heavy detritus most of which passes along the bottom of the channel 2, drops or rapidly settles into the pit or trap 22 which forms the lower end of the classifier trough 23, any finer or lighter grit remaining in suspension passing along with the other suspended solids through the influent channel 3 to the chamber 1. The distributing vanes 5 being properly adjusted, cause the sewage to flow evenly into the chamber at all points crossing the entire chamber at greatly reduced velocity. There is thus produced a period of detention determined by the size of the chamber which is so proportioned that all particles having a settling rate above a given value will be permitted to settle to the bottom of the chamber, lighter suspended solids, mostly organic substances, passing on over the weirs 7. The particles setting on the bottom of the chamber 1, substantially all grit, are swept by the action of the rakes 16 and scoop 17 to the discharge outlet 12, passing along the inclined bottom 26 of the discharge opening into the classifier trough 23. Thus the one classifier trough 23 receives the accumulations of grit collected by both the trap 22 and settling chamber 1.

The classifier mechanism 27 being in operation conveys all accumulations of grit discharged into the trough 23 up the inclined bottom of the trough, the lighter solids thrown into suspension by the motion of the rakes, as previously described, returning to the chamber 1 with the liquid carried up by the classifier rakes above the water level and overflowing into the liquid return openings 30. The grit is then further drained during the remainder of its travel up the trough to the discharge end 24 over which it falls into the grit chute 29 and receiver 36.

While a specific embodiment of the invention has been herein shown and described for the purpose of disclosure, it is to be understood that the invention is not limited in practice to such specific embodiment but contemplates all such modifications and variants thereof as fairly fall within the scope of the appended claims.

What I claim is:

1. Apparatus for removing solids from liquids comprising a main settling chamber, a feed channel arranged to direct a flow of liquid to said chamber, a solid strap operatively associated with said feed channel in advance of the main settling chamber, a mechanical classifier unit extending from the bottom of the trap to a point of solids discharge above a given high water level, means for discharging settled solids from the chamber into the classifier at a point below the bottom of the chamber and above the level of the bottom of the trap, and means for conveying liquid from the classifier at a point above the liquid level in the chamber and below the point of solids discharge, to the main settling chamber.

2. Apparatus for removing solids from liquids comprising a main shallow settling chamber having a solids discharge opening in the bottom at one side, means for impelling settled solids along the bottom into the discharge opening, a preliminary settling chamber communicating with the main chamber and having a bottom situated below the level of the bottom of the main chamber, a solids conducting trough having a sloping bottom extending upwardly from the bottom of the preliminary settling chamber to a solids discharge point situated at a level above a given high water level, said main chamber discharge opening communicating with the said solids conducting trough at a point above the level of the bottom of the preliminary settling chamber, said trough being arranged to permit overflow therefrom back to the main chamber from a level in the trough slightly above the water level in the main chamber, and a solids conveyor in said trough arranged to convey solids up therethrough to the said solids discharge point.

3. A sewage treating apparatus that includes a main settling tank having an influent conduit leading thereto, an effluent conduit leading therefrom and a sludge discharge outlet, the bottom of said influent conduit being intercepted for the full width thereof by a depressed pocket providing a sand trap that extends well below said sludge discharge outlet and over which depressed pocket the inflowing sewage must pass prior to entering the settling space within the settling tank, a raking mechanism operable to impel settled solids in the form of a sludge from the bottom of the settling space of the tank through the sludge discharge outlet, and a classifier providing a trough and a movable classifying element, which said trough has a sloping bottom leading upwardly from the lower interior portion of said pocket, which said trough is arranged to receive on an intermediate section of the sloping bottom thereof sludge passed thereto through said sludge discharge outlet, and which said trough provides at the upper section thereof a solids discharge section that is above the high water level within the settling tank, which said classifying element extends upwardly from within the depressed pocket along and past the intermediate section whereat the sludge is received into the trough to position for transferring inorganic solids in the form of grit or sand to the solids discharge section, the classifier being so constructed and so arranged with respect to the tank that submerged organics left behind as the result of the classifying operation will pass into the stream of sewage flowing through the apparatus.

4. An apparatus according to the claim last preceding and which apparatus is constructed so that the classifier functions whereby there is delivery from the solids discharge section thereof of both the grit passed thereto from the grit trap and the inorganic or grit solids passed thereto after having been separated from the sludge as the result of the classification carried out as the classifier functions, and whereby there is a return to the sewage stream within the settling chamber of liquid with submerged organics left therein as the result of the classification.

EDMUND B. BESSELIEVRE.